(12) United States Patent
Lin et al.

(10) Patent No.: US 9,770,827 B2
(45) Date of Patent: Sep. 26, 2017

(54) ROBOT CONTROL SYSTEM

(71) Applicant: HON HAI PRECISION INDUSTRY CO., LTD., New Taipei (TW)

(72) Inventors: Shih-Pin Lin, New Taipei (TW);
Ting-Yi Liao, New Taipei (TW);
Chang-Da Ho, New Taipei (TW);
Yi-Cheng Lin, New Taipei (TW);
Sei-Ping Louh, New Taipei (TW);
Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 172 days.

(21) Appl. No.: 14/920,388

(22) Filed: Oct. 22, 2015

(65) Prior Publication Data

US 2016/0346933 A1 Dec. 1, 2016

(30) Foreign Application Priority Data

May 27, 2015 (CN) .......................... 2015 1 0276538

(51) Int. Cl.
*B25J 9/16* (2006.01)
*G05B 19/406* (2006.01)

(52) U.S. Cl.
CPC .......... *B25J 9/1694* (2013.01); *G05B 19/406* (2013.01); *G05B 2219/39059* (2013.01)

(58) Field of Classification Search
CPC ................. B25J 9/1694; G05B 19/406; G05B 2219/39059
See application file for complete search history.

(56) References Cited

U.S. PATENT DOCUMENTS

| | | | |
|---|---|---|---|
| 2015/0019013 A1* | 1/2015 | Rose | G01L 1/16 700/258 |
| 2016/0346933 A1* | 12/2016 | Lin | B25J 9/1694 |

\* cited by examiner

*Primary Examiner* — Ian Jen
(74) *Attorney, Agent, or Firm* — Steven Reiss

(57) ABSTRACT

The present disclosure relates to a robot control system, the robot control system includes a mobile terminal coupled to a robot. The robot includes a sensing module, a controller and a first display, the mobile terminal includes a control system and a wireless communication module, the control system includes an image module; the sensing unit is used to sense a force acting on the robot and a direction of the force, the controller controls the robot to transfer the information of the force and the direction to the wireless communication module by a cloud, the image module processes the information of the force and the direction of the force to gain an emotion signal, the wireless module and the cloud transfer the emotion signal to the robot, the controller controls the first display to display a corresponding emotion icon.

6 Claims, 6 Drawing Sheets

ROBOT CONTROL SYSTEM

FIELD

The subject matter herein generally relates to mobile terminals, and particularly relates to a mobile terminal can communicate with and/or control an emotion interactive personal robot.

BACKGROUND

Many mobile terminals have touch screens. A touch screen can provide a user interface between the mobile terminal and a user of the mobile terminal. Each program of the mobile terminal has a corresponding interactive button displayed on the display unit, and the program can be activated or managed by touching the interactive button. Further, some of the mobile terminals can communicate with and/or control other devices, such as toys, vehicles, or robots.

BRIEF DESCRIPTION OF THE DRAWINGS

Implementations of the present technology will now be described, by way of example only, with reference to the attached figures.

DETAILED DESCRIPTION

Figure 1:
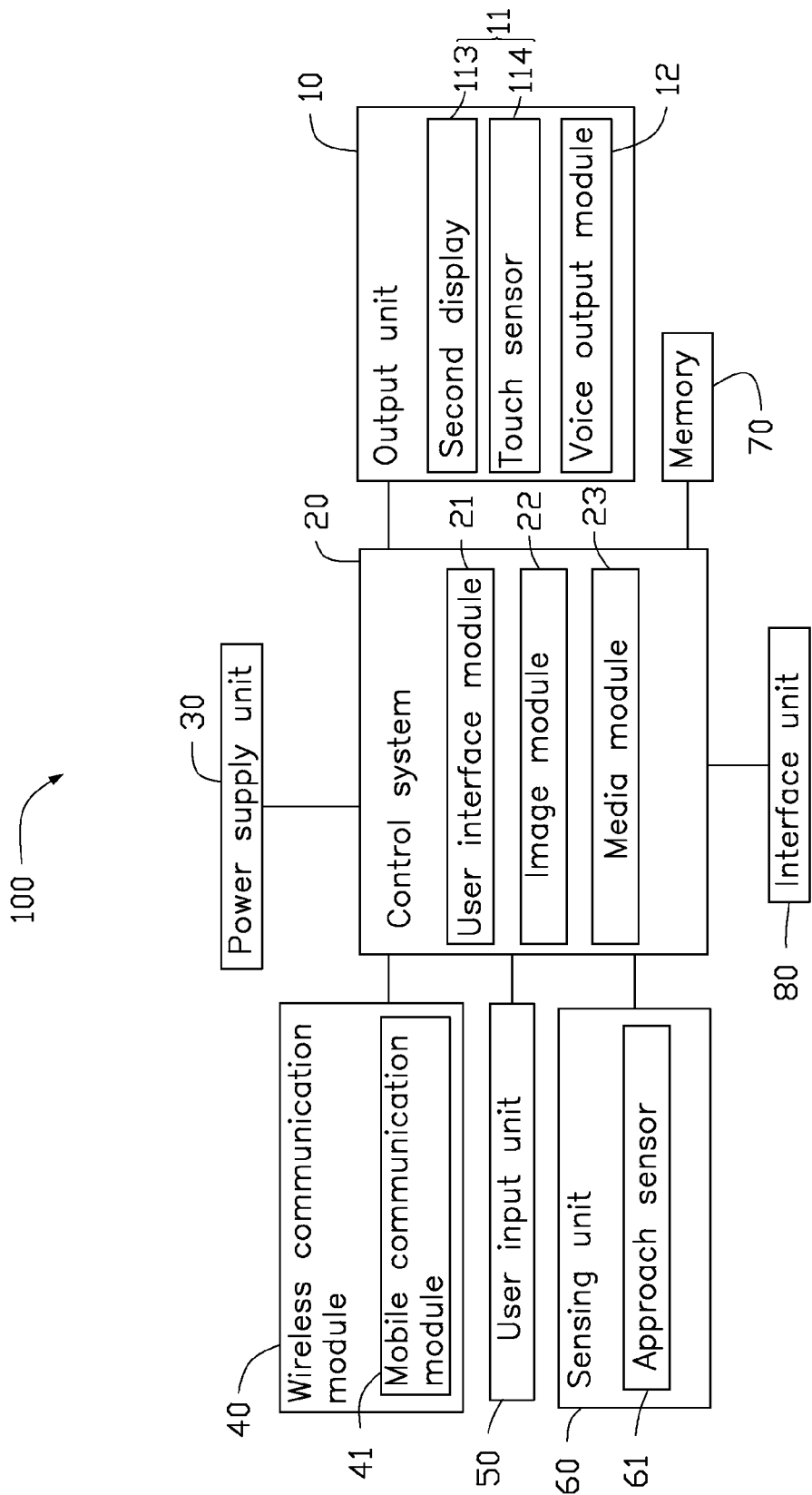
FIG. 1 is a block diagram of an embodiment of a mobile terminal of a robot control system of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The present disclosure is described in relation to a mobile terminal used in robot control system.

Figure 2:
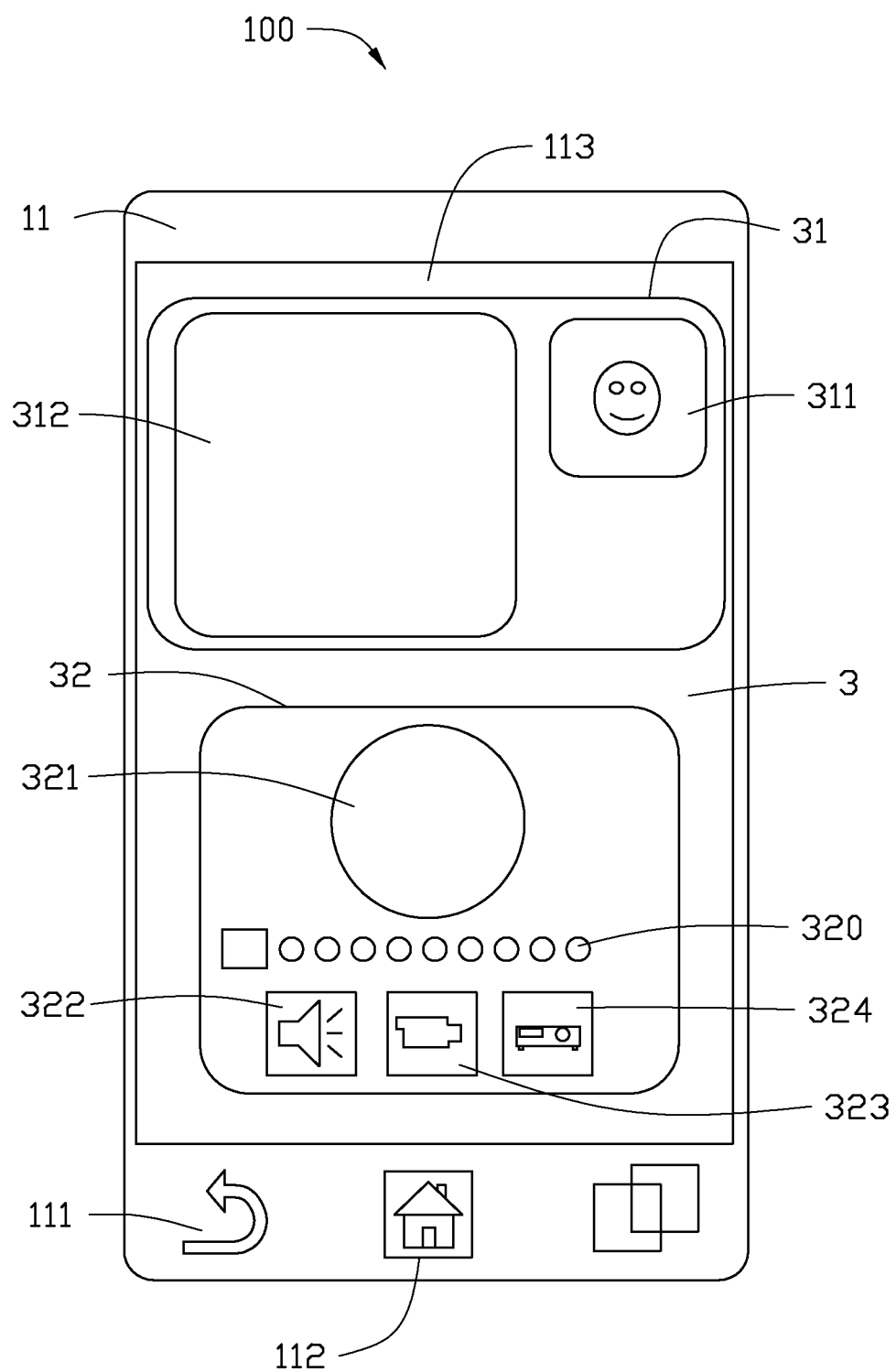
FIG. 2 is a diagrammatic view of a user interface of the mobile terminal of FIG. 1 being in a stand-by mode.
Figure 3:
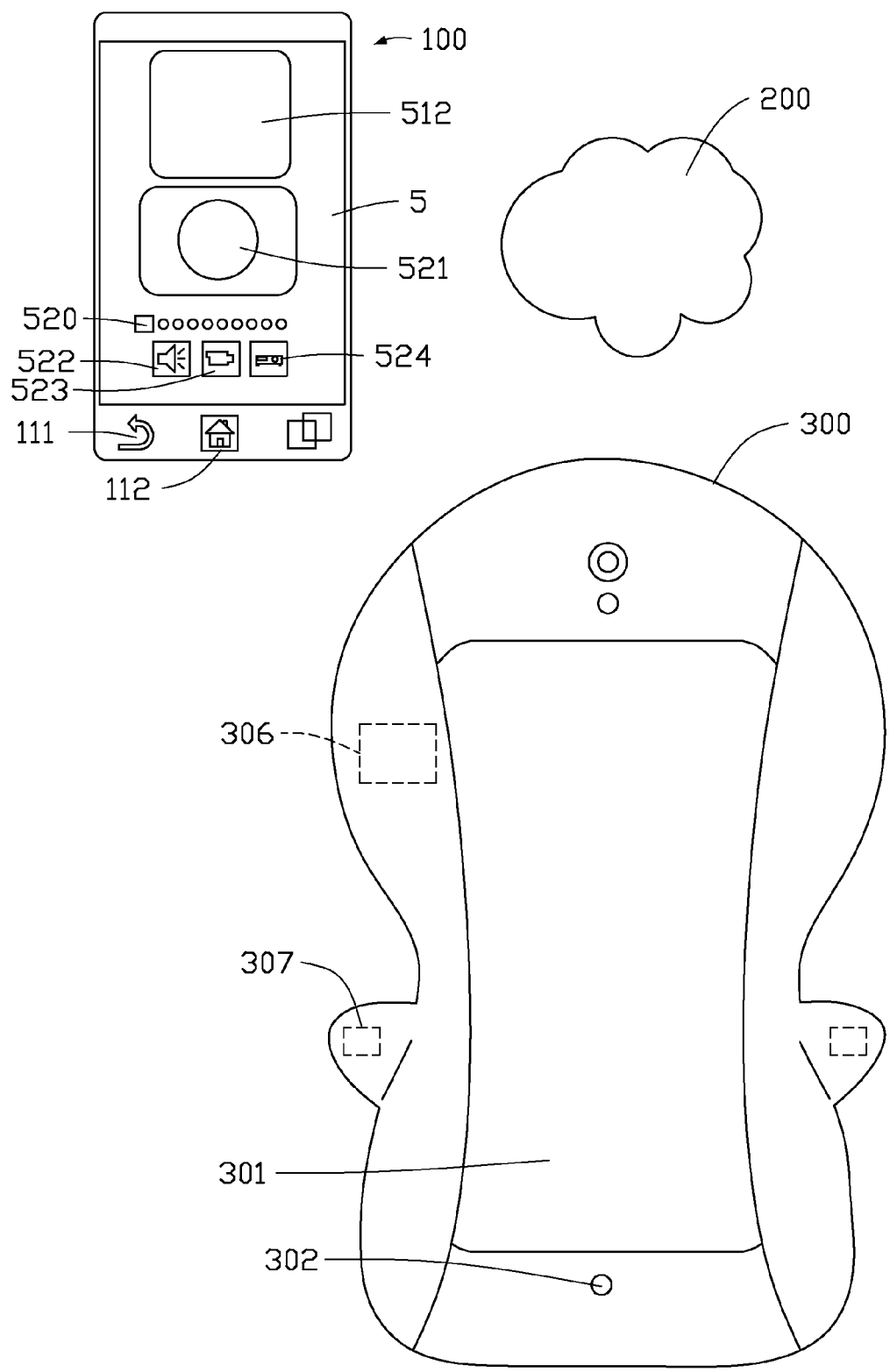
FIG. 3 is a diagrammatic view of a user interface of the mobile terminal of FIG. 1 working in an activated mode.
Figure 4:
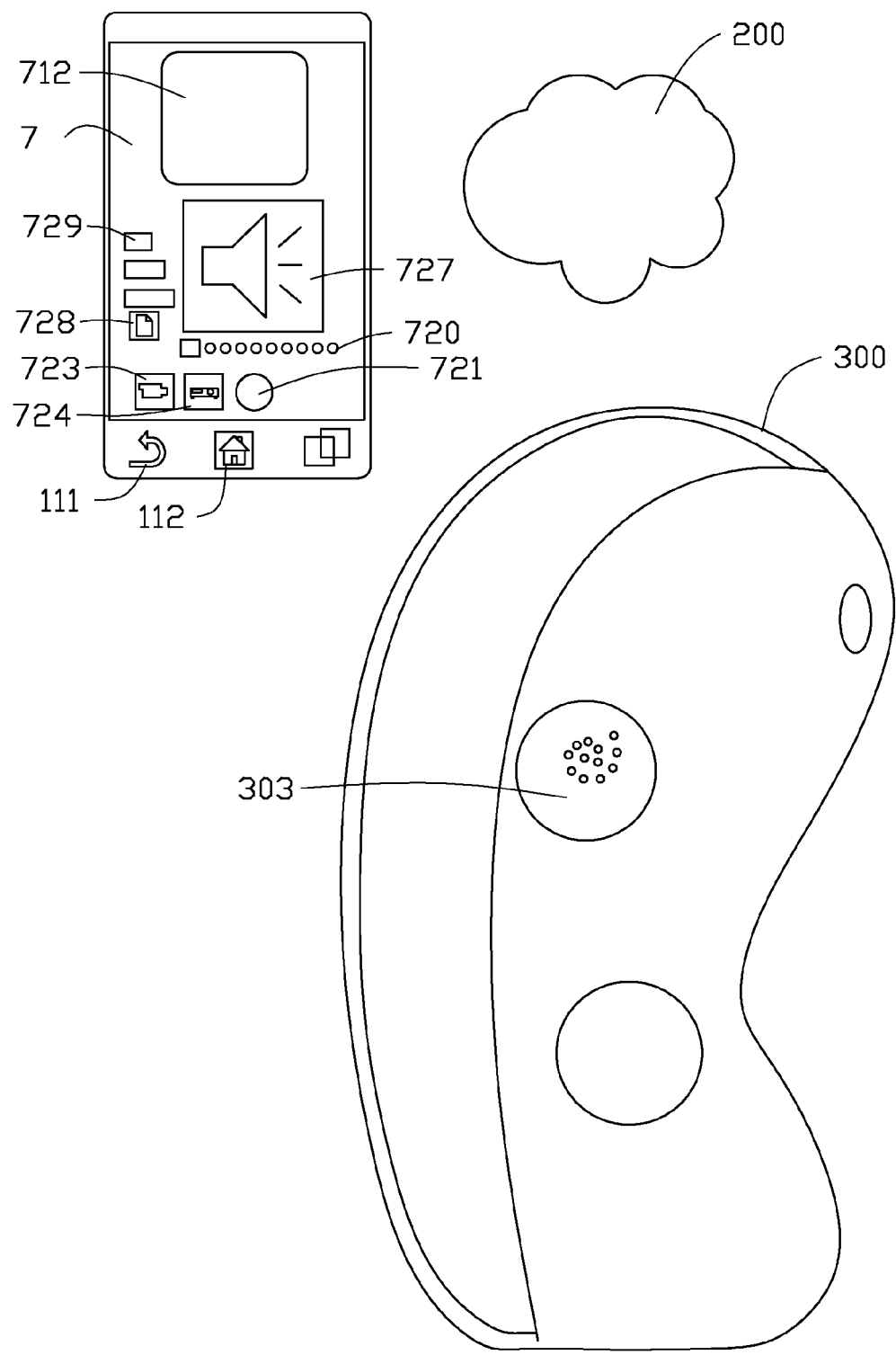
FIG. 4 is a diagrammatic view of a user interface of the mobile terminal of FIG. 1 working in a sound mode.
Figure 5:
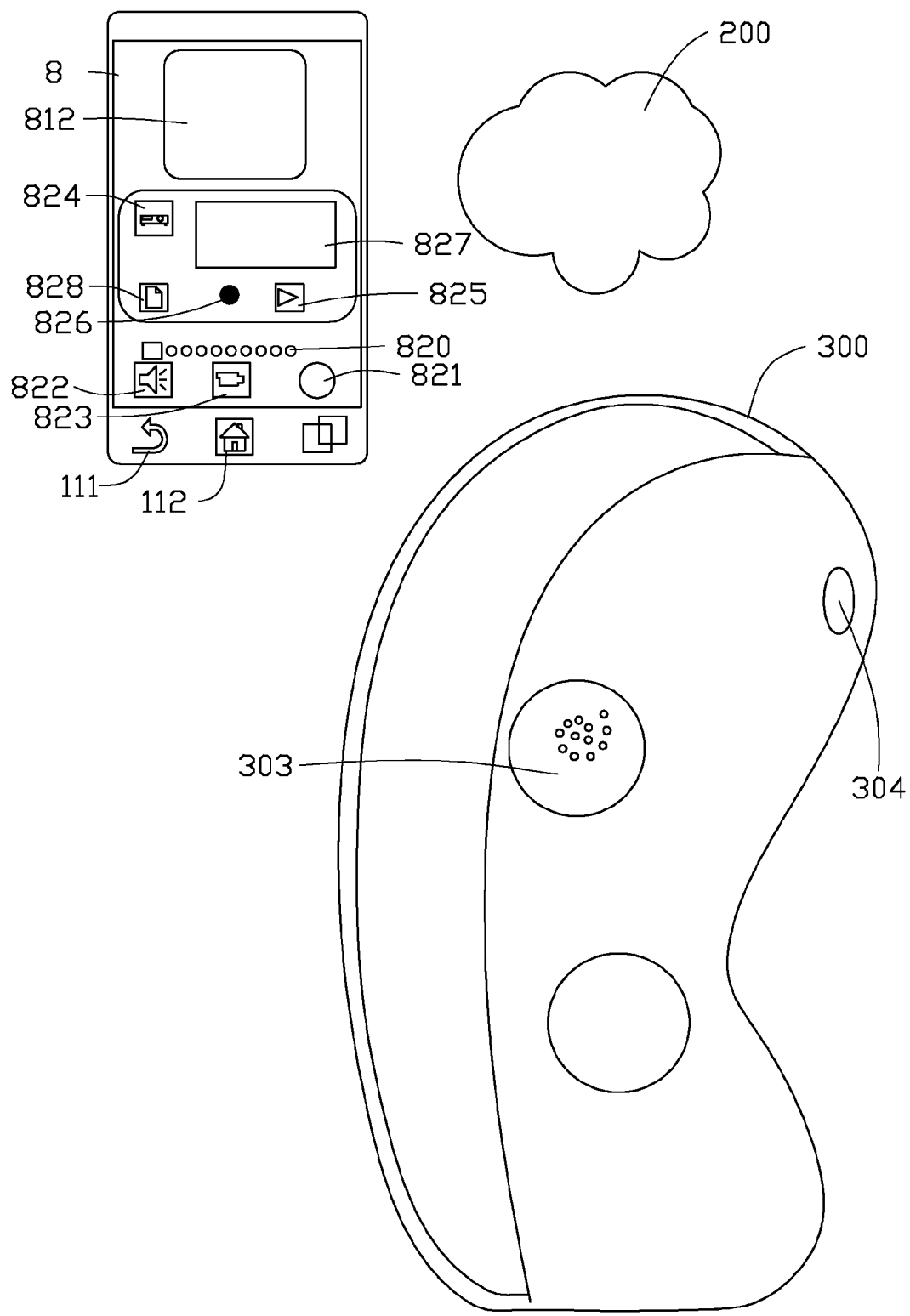
FIG. 5 is a diagrammatic view of a user interface of the mobile terminal of FIG. 1 working in a projection mode.
Figure 6:
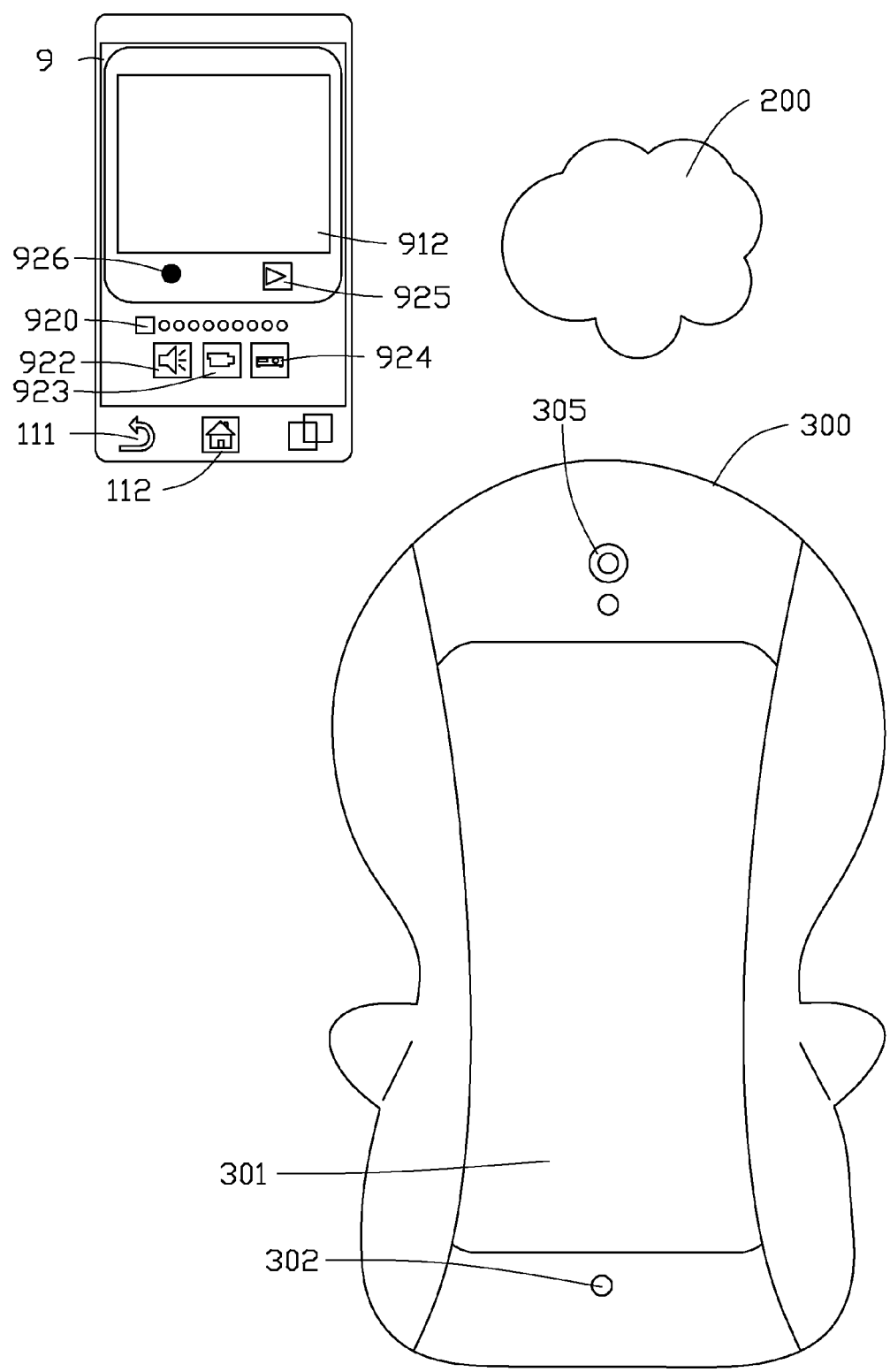
FIG. 6 is a diagrammatic view of a user interface of the mobile terminal of FIG. 1 working in a video mode.

FIGS. 1-6 illustrate an embodiment of a mobile terminal 100. The mobile terminal 100 includes an output unit 10, a control system 20, a power supply unit 30, a wireless communication module 40, a user input unit 50, a sensing unit 60, a memory 70 and an interface unit 80. The output unit 10, the power supply unit 30, the wireless communication module 40, the user input unit 50, the sensing unit 60, the memory 70 and the interface unit 80 are connected to the control system 20. In other embodiment, the mobile terminal 100 can include more components or less components.

The output unit 10 is configured to output information, such as visual information and/or auditory information. The output unit 10 includes a second display 113, a touch sensor 114 and an audio output module 12. The second display 113 is used to display user interface information related to the mobile terminal 100. The touch sensor 114 is used to detect touch acted on the second display 113. The second display 113 and the touch sensor 114 cooperatively form a touch screen 11. The second display 113 can be used both as an input device and an output device. The touch sensor 114 can be a touch foil or touch panel. The audio output module 12 is used to output audio information received by the wireless communication module 40 or audio information stored in the memory 70.

The control system 20 includes a user interface module 21, an image module 22, and a multi-media module 23. The user interface module 21 is used to control the second display 113 to display a predetermined user interface under predetermined conditions. The image module 22 is used to control a first display 301 of a robot 300 coupled to the mobile terminal 100 to display emotion icons. The media module 23 is used to receive and output images.

The wireless communication module 40 includes a mobile communication module 41. The mobile communication module 41 is used to send wireless signal to at least one network entity or receives the wireless signal from the at least one network entity. The network entity can be a server, a host or a mobile electronic device. The wireless signal can be audio information, video information and so on. In other embodiment, the wireless communication module 40 can include a radio receiver module, a wireless internet module, a short distance communication module, GPS module and so on, according to practical requirements.

The user input unit 50 responds input data generated by operation acted on related input devices by a user. In at least one embodiment, the input device can be the touch screen 11.

The sensing unit 60 includes a proximity sensor 61, the proximity sensor 61 is used to detect object that is close to the touch screen 11 or is surround the touch sensor 61. The proximity sensor 61 is located in an area that is surrounded by the touch screen 11 or is surround the touch screen 11. In other embodiment, the sensing unit 60 can also include other components, and the other components can be used to detect a status of the power supply unit 30, such as whether the mobile terminal 100 is powered on.

The memory 70 can be any type of memory or storage device or their combination.

Through the interface unit 80, the mobile terminal 100 can be electrically connected to an external device, such as an electronic device, a computer host, or an charging device, thereby, information can be transmitted between the mobile terminal 100 and the external device through the interface unit 80, and/or the mobile terminal 100 can be charged through the interface unit 80.

In at least one embodiment, the mobile terminal 100 can communicate with the robot 300 through the wireless communication module 40, and a user can control the robot 300 through the mobile terminal 100. The robot 300 includes a first display 301, a loudspeaker 302, a microphone 303, a projector 304 and a front camera 305.

When the mobile terminal 100 is in a stand-by mode, the second display displays a first user interface 3. The first user interface 3 includes a display area 31 and an instruction area 32, the display area 31 and the instruction area 32 are arranged along a length direction of the touch screen 11. The display area 31 includes an emotion icon display area 311 and an image display area 312, the emotion icon display area 311 is used to display current emoticons of the robot 300. The instruction area 32 includes several emotion icons 320, a movement control key 321, an audio button 322, an image button 323 and a projection button 324. Each emotion icons 320 shows a miniature emotion icon. The movement control key 321 is used to control movement of the robot 300.

Touching the audio button 322 can make the mobile terminal 100 switch to a sound mode, the control system 20 control the mobile communication module 41 to transfer the audio data stored in the memory 70 to the robot 300 by the cloud 200, the loudspeaker 302 of the robot 300 outputs voice corresponding to the audio data. The robot 300 is also used to record audio and transfers the audio to the mobile terminal 100 by the cloud 200, the mobile communication module 41 of the wireless communication module 40 receives the audio, the control system 20 controls the audio output module 12 of the output unit 10 to output corresponding audio. Touching the image button 323 can make the mobile terminal 100 switch to a video mode, the second display 113 displays the image captured by the robot 300. Touching the projection button 324 can make the mobile terminal 100 switch to a projection mode, the media module 23 of the control system 20 controls the mobile communication module 41 send the image information stored in the memory 70 to the robot 300 by the cloud 200, the robot 300 plays the image information. In at least one embodiment, the number of the several emotion icon 320 is ten. In other embodiment, the number of the emotion icon 320 can be other quantity.

Touching the movement control key 321, the user interface module 21 of the control system 20 processes touching signal acted on the movement control key 321 and controls the mobile terminal 200 to switch to a activated mode, the mobile terminal 100 controls the movement the robot 300 and controls the second display 301 to display emoticons.

The second display 113 displays a second user interface 5, the second user interface 5 includes a image display area 512, emotion icon 520, a movement control key 521, a audio button 522, an image button 523 and a projection button 524. Dragging the movement control key 521, the control system 20 processes dragging signal of the movement control key 521 to gain a corresponding control signal, the mobile communication module 41 of the wireless communication module 40 sends the control signal to the robot 300 by the cloud 200 to control the robot 300 to move.

The sensor module 307 of the robot 300 senses a force acted on the robot 300 and a direction of the force, the robot 300 sends the force and the direction of the force to the mobile communication module 41 of the wireless communication module 40 by the cloud 200. The image module 22 of the control system 20 receives the information of the force and the direction of the force and processes the information of the force and the direction of the force to gain emoticons, and the mobile communication module 41 sends the emoticons to the robot 300. A controller 306 of the robot 300 controls the first display 301 to display corresponding emoticons. Meanwhile, the control system 20 controls a corresponding emotion icon 520 to open according to the emoticons gained by the image module 22 to display current emoticons of the first display 301 of the robot 300.

Any one of the audio button 522, the image button 523 and the projection button 524 is touched, the control system 20 controls the mobile terminal 100 to switch to a corresponding state. A return key 111 of the touch screen 11 is touched, the control system 20 processes signal of the return key 111 and controls the second user interface 5 return to a previous user interface. A main menu 112 of the touch screen 11 is touched, the control system 20 controls the mobile terminal 100 to return the stand-by mode.

When the audio button 522 is touched, the user interface module 21 of the control system 20 processes touch signal of the audio button 522 and controls the mobile terminal 100 to switch to a sound mode. The second display 113 displays a third user interface 7, the third user interface 7 includes an image display area 712, several emotion icons 720, a movement control key 721, an image button 723, a projection button 724, a document display area 727, a document catalog key 728 and a volume display key 729. The control system 20 controls the mobile communication module 41 transfers the audio information stored in the memory 70 to the robot 300 by the cloud 200, the loudspeaker 302 of the robot 300 outputs voice corresponding to the audio information. The microphone 303 of the robot 300 is also use to record audio and transfers the audio to the mobile terminal 100 by the cloud 200, the mobile communication module 41 of the wireless communication module 40 receives the audio, the control system 20 controls the audio output module 12 of the output unit 10 to output corresponding audio. The document display area 727 is used to display a corresponding audio document that is received or output by the mobile terminal 100. The document catalog key is used to display the document directory of the audio information stored in the memory 70. The volume display key 729 is used to display volume of audio output.

When the projection button 724 is touched, the user interface module 21 of the control system 20 processes touch signal of the projection button 724 and controls the mobile terminal 100 to switch to a projection mode. The second display 113 displays a forth user interface 8, the fourth user interface 8 includes a image display area 812, several emotion icon 820, a movement control key 821, a audio button 822, a image button 823, a projection button 824, a start and stop key 825, a video key 826, a document display area 827 and a document catalog key 828. The media module 23 of the control system 20 control the mobile communication module 41 sends the image data stored in the memory 70 to the robot 300 by the cloud 200, a projector 304 of the robot 300 display the image data. The start and stop key 825 is used to control the start and pause of the projector 304.

The image button 823 is touched, the user interface module 21 of the control system 20 processes touch signal of the image button 823 and controls the mobile terminal 100 to switch to a video mode. The second display 113 displays a fifth user interface 9, the fifth user interface 9 includes a image display area 912, several emotion icons 920, a audio button 922, an image button 923, a projection button 924, a start and stop key 925 and a audio button 926. The front camera 305 of the robot 300 is used to capture images. The robot 300 transfers the images captured by the front camera 305 to the mobile terminal 100 by the cloud 200, the mobile communication module 41 receives the images. The media module 23 of the control system 20 controls the second display 113 to display the images captured by the front camera 305. The video key 926 is used to control on-off of the front camera 305 of the robot 300.

The embodiments shown and described above are only examples. Many details are often found in the art such as the other features of a robot control system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A robot control system comprising:
    a robot comprising:
        a sensing module configured to sense a force acted on the robot and a direction of the force;
        a controller coupled to the sensing module; and
        a first display coupled to the controller;
    the mobile terminal comprising:
        a wireless communication module configured to receive the force and direction of the force transmitted via a could system;
        a control system comprising a image module configured to processes the information of the force and the direction of the direction to gain an emotion signal, and
        the wireless module and the cloud transfer the emotion signal to the robot, the controller controls the first display to display a corresponding emotion icon.

2. The robot control system of claim 1, wherein the mobile terminal comprising a memory and a second display; the control system comprising a user interface module and a media module, the user interface module being used to control the second display to display a predetermined user interface under predetermined conditions.

3. The robot control system of claim 2, wherein the controller of the robot controlling the first display to display corresponding emoticons; the media module being used to control the mobile communication module sends the image data stored in the memory to the robot by the cloud or receive the image data sent by the robot.

4. The robot control system of claim 3, wherein the mobile terminal comprising audio output module, the audio output module being used to output audio data received by the mobile communication module or audio data stored in the memory.

5. The robot control system of claim 4, wherein when the mobile terminal being in a stand-by mode, the second display displaying a first user interface.

6. The robot control system of claim 5, wherein the first interface comprising a an instruction area, the instruction area comprising a movement control key, a audio button, an image button and a projection button , when the movement control key , the audio button, the image button and the projection button are touched respectively, the user interface module controlling the mobile terminal to switch to a activated mode, a sound mode, a video mode and a projection mode respectively.

* * * * *